Feb. 15, 1966 A. V. RAYMOND 3,234,612
PANEL FASTENER
Filed Nov. 27, 1963 3 Sheets-Sheet 1
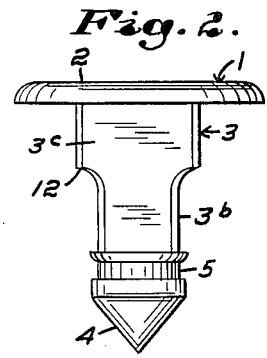
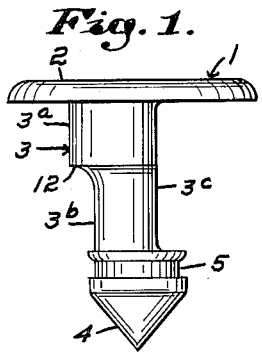
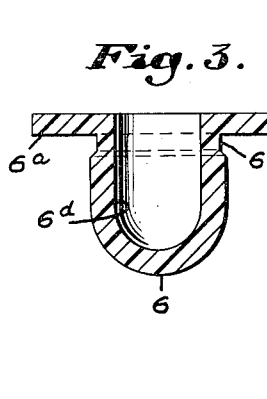
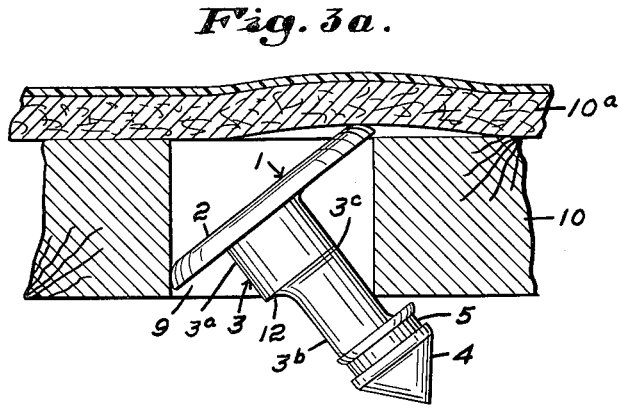
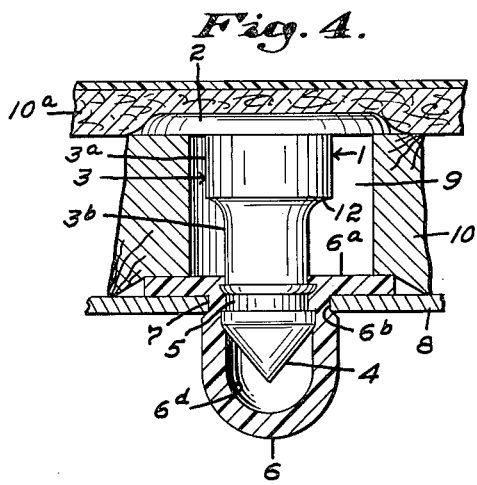
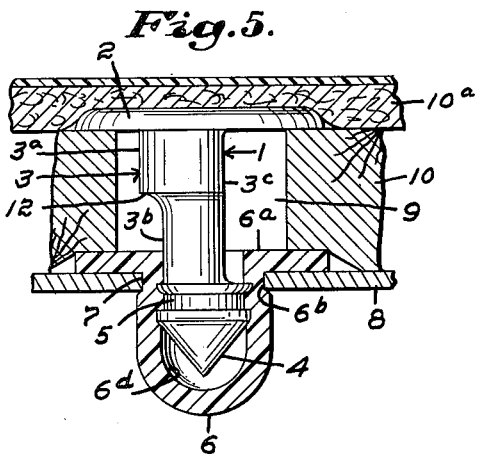
Inventor
Albert Victor Raymond,
by
Atty.

Feb. 15, 1966 A. V. RAYMOND 3,234,612
PANEL FASTENER
Filed Nov. 27, 1963 3 Sheets-Sheet 2
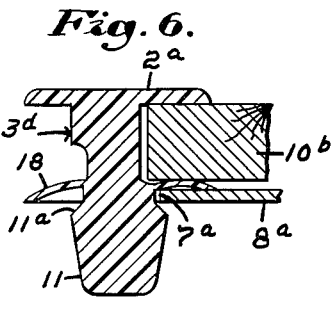
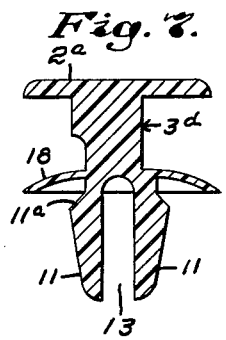
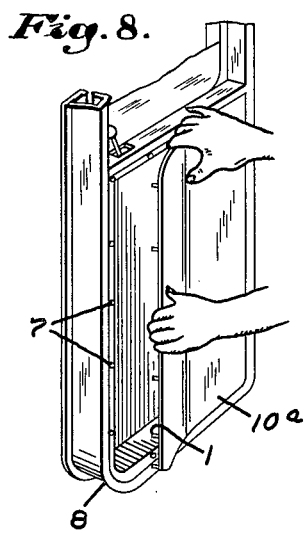
Inventor:
Albert Victor Raymond,
by Gordon Needleman
Atty.

Feb. 15, 1966  A. V. RAYMOND  3,234,612
PANEL FASTENER
Filed Nov. 27, 1963  3 Sheets-Sheet 3
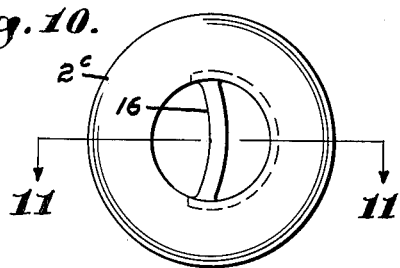
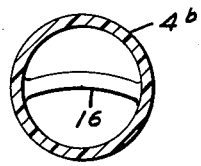
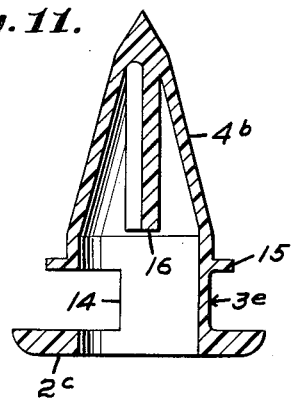
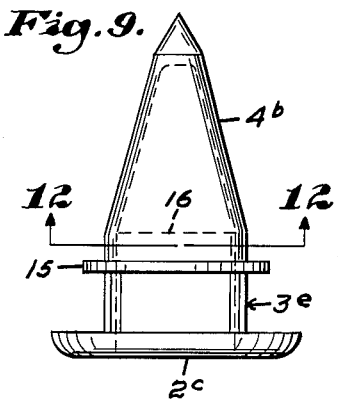
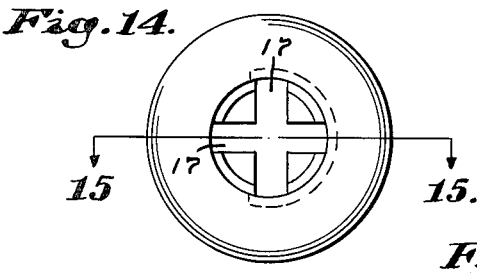
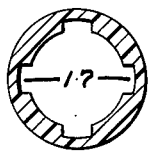
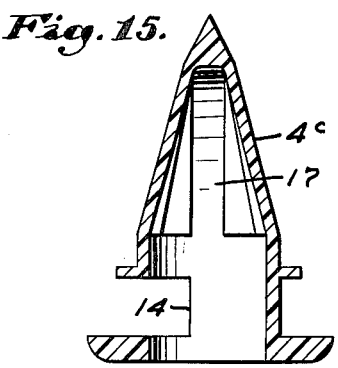
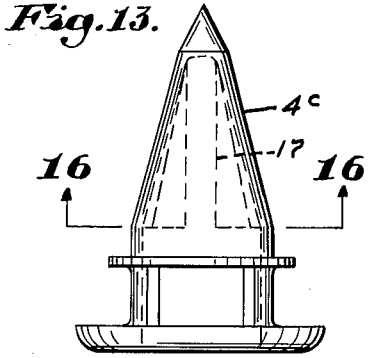
Inventor:
Albert Victor Raymond,
by Gordon Needleman
Atty.

United States Patent Office 3,234,612
Patented Feb. 15, 1966

3,234,612
PANEL FASTENER
Albert Victor Raymond, Grenoble, France, assignor to A. Raymond, Grenoble, France, a firm
Filed Nov. 27, 1963, Ser. No. 326,409
Claims priority, application France, Dec. 13, 1962, 918,487, Patent 1,350,099
2 Claims. (Cl. 24—73)

This invention relates generally to fastening devices and more specifically to panel fasteners.

An object of the present invention is to provide a panel fastener having means of engaging a panel having a blind aperture.

When an automobile has certain types of body repair or at the time it is manufactured panels of cardboard, plywood or similar material are fastened to a support such as metallic frames or uprights. These panels are generally covered, at least the surface forming the interior of the automobile, with felt and then with a film of synthetic plastic material or other decorative trimming. The laying of such panels must be capable of being done quickly by means of fasteners that are easy to place and which cannot be detached by themselves from the panel after having been fastened to the latter. It is also desirable that the fasteners can be put in place only at the last moment, which allows piling up of the panels one upon the other, without risk of damaging said panels by the fasteners. Moreover, large tolerances of mounting are necessary to allow for differences in the drilling jigs or the variations of dimensions of the panels under the effect of the hygrometric state of the air.

Finally, it is preferable that one be able to take apart the panel without damaging it, for example, in order to make repairs.

The present invention has for its object an improved fastener allowing, among other things, the satisfying of the conditions enumerated above.

This fastener is essentially constituted by a button with flat head whose stem has, under the head, a disengagement which allows the mounting of the fastener on the panel while causing the head to pass obliquely into an opening longer than but not so wide as said head, provided for this purpose in the panel, the head of the fastener then being inserted between the panel and its cover and the fastener having a sufficient play, in the opening to satisfy the tolerances of manufacture, while nevertheless being able to be separated from the panel only by a movement reverse to that which was used for its mounting.

The fastening of the fastener to the support can be made by fastening the free end of the stem either directly in a hole of the support or in an internal piece, for example, in the form of a cap, itself fixed in a hole of the support and moreover, assuring the water-tight quality of the assemblage.

In the case of a direct driving in of the fastener into the hole of the support, this fastener advantageously has a water-tight flange in the form of a meniscus which is put on the wall of the support.

Other objects of the invention will, in part, be obvious and will, in part, appear hereinafter.

In the drawings:

FIG. 1 is a side elevation of a fastener according to the invention;

FIG. 2 is a front elevation of the fastener shown in FIG. 1;

FIG. 3 is a section of the internal piece;

FIG. 3a is a side elevation of the fastener shown in FIG. 1 partially engaged to a support and its cover, both of the latter shown in cross-section;

FIG. 4 is a section of the cover, panel, internal piece and a support assembled with the fastener shown in rear elevation;

FIG. 5 is a section of the cover, panel, internal piece and a support assembled with the fastener shown in side elevation;

FIG. 6 is a section of a variation of the fastener showing one half engaged to a sectioned panel and support;

FIG. 7 is a section of a variation of the fastener shown in FIG. 6 including a longitudinal groove;

FIG. 8 illustrates the total mounting of the panel with the support broken off;

FIG. 9 is a side elevation of another variation;

FIG. 10 is a top plan view of the fastener shown in FIG. 9;

FIG. 11 is a section taken on line 11—11 of FIG. 10;

FIG. 12 is a section taken on line 12—12 of FIG. 9;

FIG. 13 is a side elevation of still another variation of the fastener;

FIG. 14 is a top plan view of the figure shown in FIG. 13;

FIG. 15 is a section taken on line 15—15 of FIG. 14; and

FIG. 16 is a section taken on line 16—16 of FIG. 13.

In the embodiment represented in FIGS. 1 to 5, the fastener 1 comprises a flat head 2, a stem 3 and a point 4 which has a peripheral groove 5. The dimensions of the various parts of the fastener depend on those of the element that the latter must serve for fastening. In the example represented, the stem has two portions $3a$ and $3b$ of different diameters, the diameter $3b$ being a little smaller than the maximum diameter of the point 4. Moreover, the stem 3 has a cut out section which forms a flat space $3c$ and provides a shoulder 12. The fastener can be made of synthetic plastic material, sufficiently rigid (polypropylene, for example).

It is designed to work together with an internal piece 6 (FIG. 3) in the form of a cylindro-spherical cap provided with a water-tight edge $6a$ and with an exterior peripheral groove $6b$ permitting its interlocking in a hole 7 formed in the support 8, for example a sheet iron frame (FIGS. 4 and 5). The diameter of the bore $6d$ of the internal piece 6 is slightly less than the maximum diameter of the point 4. The internal piece 6 is made of fairly supple material, for example of polyamide or polyethylene.

The assemblage by means of the element which has just been described is very simple.

The internal piece 6 is engaged in a hole 7 of the frame 8, the edge of this hole being interlocked in the peripheral groove $6b$ of the internal piece 6.

To mount the fastener on the panel 10, which for this purpose has elongated openings 9 whose length is superior to the diameter of the head 2 while the depth is contained between the diameters of the head and the stem 3, one inserts the fastener, head first, inclining it, into the opening 9, the flat space $3c$ assuring the clearance necessary to the passage of the head which comes to rest between the panel 10 and its cover $10a$ (FIG. $3a$). Once in place, the fastener can slide in all paths relative to the panel, but it can go out of the opening 9 only if one inclines the stem 3 according to the reverse process to that which was used in mounting. To fasten the panel to the frame 8 one drives the point 4 of each of the fasteners into the bore or opening $6d$ of the corresponding internal piece 6. The groove 5 assures the engagement of the point to the hood, either at the level of the frame 8 (FIG. 4), or at a lower level (FIG. 5). In this way, the water-tightness of the assemblage is assured.

As FIG. 8 shows, the mounting is very quick and offers no difficulty, as also, moreover, the dismantling.

FIGS. 6 and 7 show variants of fasteners which permit laying of panels on the frames without the aid of a water-tight internal piece 6.

The stem 3d of the fastener and the head 2a remain the same. The point 11 has essentially the shape of a truncated cone and it has a shoulder 11a, likewise in the shape of a truncated cone, designed to be supported under the frame 8a whose hole 7a has a diameter less than the maximum diameter of the point. Above the point 11 is a water-tight, radial flange 18, in meniscus form, which is placed on the side of the frame turned toward the panel 10b (half of the right side of FIG. 6).

The material which makes up the fastener has a certain suppleness or resiliency necessary to the deformation of the point 11 and of the flange 18. To increase the latitude of deformation, one can provide a gap or longitudinal groove 13 in the point 11, as FIG. 7 shows.

Another variant of the fastener is represented on FIGS. 9 to 12. The stem 3e is hollow and, under the head 2c, there is provided a clearance area 14 which plays the role of the flat area that the preceding embodiments have. The fastener has a flange 15 and its point 4b is made more elastic than the adjacent part of the stem 3c in such a way as to permit the interlocking in the hole of the support, thanks to a curved inner membrane 16.

In the variant of the FIGS. 13 to 16, the fastener is similar to the preceding but the difference in elasticity is assured by some notches 17 provided in the wall of the point 4c. As illustrated the notches 17 are provided in four points of the lateral wall of this point 4c.

While there have been illustrated and described preferred embodiments of the invention, it should be understood that the invention is best defined by the following claims.

I claim:
1. A fastening device including a stud element, said stud element comprising a head portion and a free terminal end portion connected to said head portion by a stem, said stem defining a channel between said terminal end portion and said head portion, and having an upper portion and a lower portion, said upper portion having a diameter greater than said lower portion to provide a shoulder therebetween, said upper and lower portions being partially circular in cross section, the partially circular sections being bounded by a common planar surface, and said terminal end portion having a collar portion in spaced and substantially parallel relationship with said head portion.

2. A fastening device comprising a stud element and cylindrical cap, said cap having an inner surface defining a cavity, said stud comprising a head portion and a free terminal end portion connected to said head portion by a stem, said stem defining a channel between said terminal end portion and said head portion, and having an upper portion and a lower portion, said upper portion having a diameter greater than said lower portion, providing a shoulder therebetween, said upper and lower portions being partially circular in cross section, the partially circular sections being bounded by a common planar surface, and said terminal end portion having a collar portion in spaced, substantially parallel relationship with said head portion, said collar portion being adapted to engage within the said cavity of said cap against said inner surface.

References Cited by the Examiner
UNITED STATES PATENTS

| | | | |
|---|---|---|---|
| 2,146,649 | 2/1939 | Pierce | 85—5 |
| 2,780,128 | 2/1957 | Rapata | 85—5 |
| 2,862,267 | 12/1958 | Parkin | 24—73 |
| 2,895,367 | 7/1959 | Nagy | 85—1 |
| 2,909,957 | 10/1959 | Rapata | 85—5 |
| 2,948,937 | 8/1960 | Rapata | 24—73 |
| 3,037,596 | 6/1962 | Fordyce | 85—5 X |

WILLIAM FELDMAN, *Primary Examiner.*
DONLEY J. STOCKING, *Examiner.*